ated Patent [19]

United States Patent [19]
Narula et al.

[11] Patent Number: 5,480,622
[45] Date of Patent: *Jan. 2, 1996

[54] ELECTRICALLY HEATABLE CATALYST DEVICE USING ELECTRICALLY CONDUCTIVE NON-METALLIC MATERIALS

[75] Inventors: Chaitanya K. Narula, Ann Arbor; Jacobus H. Visser, Southfield; Andrew A. Adamczyk, Jr., Dearborn, all of Mich.

[73] Assignee: Ford Motor Company, Dearborn, Mich.

[21] Appl. No.: 270,617

[22] Filed: Jul. 5, 1994

[*] Notice: The term of this patent shall not extend beyond the expiration date of Pat. No. 5,431,012.

[51] Int. Cl.$^6$ .................................................. F01N 3/10
[52] U.S. Cl. .................... 422/174; 422/173; 422/177; 422/180; 422/198; 422/199; 422/211; 422/222; 60/300; 502/439; 502/527
[58] Field of Search ...................... 422/173–174, 422/177, 180, 198, 211, 199, 222; 423/213.5; 60/300, 299, 303; 392/490–491, 494; 502/439, 527; 219/552–553, 543

[56] References Cited

U.S. PATENT DOCUMENTS

| | | | |
|---|---|---|---|
| 3,409,390 | 11/1968 | Hoekstra | 423/213.5 |
| 3,791,143 | 2/1974 | Keith et al. | 60/274 |
| 4,118,199 | 10/1978 | Volker et al. | 422/171 |
| 4,128,998 | 12/1978 | Hattori et al. | 60/277 |
| 4,505,726 | 3/1985 | Takeuchi et al. | 422/174 |
| 4,547,400 | 10/1985 | Middleton et al. | 427/160 |
| 4,548,836 | 10/1985 | Middleton et al. | 427/160 |
| 4,562,095 | 12/1985 | Coulon et al. | 427/180 |
| 5,028,759 | 7/1991 | Finley | 219/203 |
| 5,051,241 | 9/1991 | Pfefferle | 420/180 |
| 5,194,229 | 3/1993 | Abe et al. | 422/174 |
| 5,202,547 | 4/1993 | Abe | 219/552 |
| 5,202,548 | 4/1993 | Kondo et al. | 219/552 |
| 5,234,668 | 8/1993 | Harada et al. | 422/174 |
| 5,277,937 | 1/1994 | Bagley et al. | 502/439 |
| 5,431,012 | 7/1995 | Narula et al. | 60/276 |

FOREIGN PATENT DOCUMENTS

| | | | |
|---|---|---|---|
| 4017360 | 5/1991 | Germany | F01N 3/28 |
| 1492929 | 11/1977 | United Kingdom | B01D 53/34 |

*Primary Examiner*—Robert J. Warden
*Assistant Examiner*—Hien Tran
*Attorney, Agent, or Firm*—Lorraine S. Melotik; Roger L. May

[57] ABSTRACT

This invention is directed to an electrically heatable catalyst device comprising an electrically insulating substrate carrying an electrically conductive material selected from metal oxides, carbides, nitrides and silicides, and applied thereon a washcoat carrying a catalyst.

9 Claims, 2 Drawing Sheets

5,480,622

ELECTRICALLY HEATABLE CATALYST DEVICE USING ELECTRICALLY CONDUCTIVE NON-METALLIC MATERIALS

Reference is made to commonly assigned related to U.S. application Ser. No. 08/270 616, entitled "SYSTEM FOR MONITORING THE PERFORCE OF AUTOMOTIVE CATALYST" to Narula et al, filed Jul. 05, 1993, now U.S. Pat. No. 5,431,012.

FIELD OF THE INVENTION

This invention is directed to a catalyst device which incorporates a non-metallic electrically conductive material layered below a catalyst/washcoat capable of heating the catalyst on the washcoat as during cold start of an engine.

BACKGROUND OF THE INVENTION

In general, catalysts such as three-way catalysts (TWC) placed in a vehicle exhaust system operate efficiently at temperatures greater than about 350° C. The exhaust gas heat from the vehicle's engine is the principal means of warming a TWC in a conventional exhaust system. During the initial start up period of the engine, after starting the engine it takes about one minute for the heated exhaust gas passing through the catalyst system to sufficiently warm the TWC to this temperature. During this start up period, the catalyst is less than efficient and exhaust gases with untreated components often end up exhausted to the atmosphere. It would be desirable to have a catalyst which is efficient at lower temperatures or a way to heat the catalyst in order to reduce the time necessary to reach the catalyst's efficient operating temperature. Prior efforts to incorporate heating elements in catalyst designs have been less than successful because conventional heating elements comprise using metallic substrates, which are power intensive if the whole catalyst is heated. Moreover, many of these heating elements do not have sustained operability in the catalyst system because of their limited durability. Such deficiencies of prior catalyst heating elements are overcome by the electrically heatable catalyst device of this invention.

DISCLOSURE OF THE INVENTION

This invention, an electrically heatable catalyst device, comprises: an electrically insulating substrate; a layer of electrically conductive material selected from the group consisting of metal oxides, carbides, nitrides and silicides applied over a surface of the substrate; a washcoat carried on a surface of the electrically conductive material layer; and a catalyst carried on a surface of the washcoat. The washcoat and catalyst may be applied as separate layers or in combination as a single layer. Preferably, the electrically conductive material is a metal oxide, such as fluorine-doped tin oxide or tin oxide-doped indium oxide, and the catalyst preferably is selected from noble metals or mixtures thereof.

This invention, an electrically heatable catalyst device employs a electrically conductive material layer as a resistance heating element, which electrically conductive material has excellent sustained durability in an exhaust gas catalyst system. In addition, the electrically conductive material desirably operates under conditions of low power consumption, because the substrate carrying the electrically conductive material heating element is electrically non-conductive and hence acts as an insulator. Furthermore, because the substrate is electrically insulating it also has low thermal conductivity, and thus the heat-loss along the substrate is substantially prevented. This device configuration also results in heat being effectively transferred directly from the electrically conducting layer to the active catalytic overlayer.

BRIEF DESCRIPTIONS OF THE DRAWINGS

DETAILED DESCRIPTION OF PREFERRED EMBODIMENTS

Figure 1:
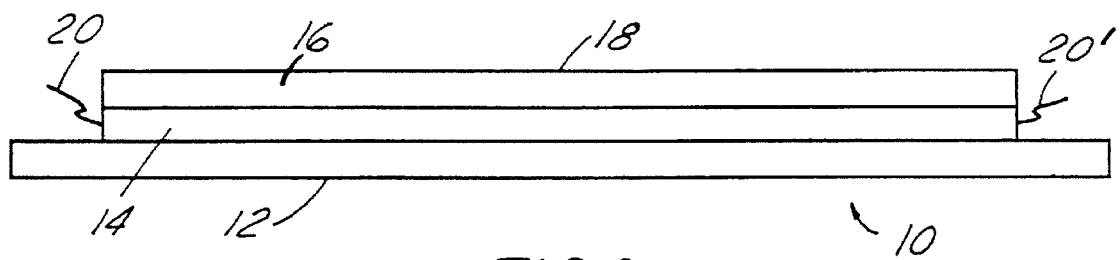
FIG. 1 is a schematic of an electrically heatable catalyst device according to an embodiment of this invention.

This invention can be readily understood with reference to FIG. 1. The electrically heatable catalyst device 10 comprises an electrically insulating substrate 12 on which is applied an electrically conductive material layer 14. A washcoat 16 is located on the electrically conductive material 14. The washcoat 16 carries a catalyst 18 on its surface. In order to be able to supply current through the electrically conductive material layer 14 during operation of the invention so as to heat the catalyst, the electrically conductive material layer 14 would contain, during operation e.g., in an automobile exhaust system, metal leads 20 and 20' separated by a distance, in contact with the electrically conductive material 14, the leads 20 and 20' being connectable to a voltage source.

The substrate 12 is made of any electrically insulating material including, but not limited to, materials such as cordierire, mullite, etc. The substrate may be in any suitable configuration, often being employed as a monolithic honeycomb structure, spun fibers, corrugated foils or layered materials. Still other insulating materials and configurations useful in this invention and suitable in an exhaust gas system will be apparent to those skilled in the art in view of the present disclosure.

The electrically conductive material 14 is selected from the group consisting of metal oxides, carbides, nitrides and silicides. Exemplary of such materials are metal oxides like fluorine doped tin-oxide, tin-oxide doped indium oxide, indium-tin-oxide, and vanadium oxide, the first two oxides being preferred, nitrides like titanium nitride or silicon nitride, carbides like silicon carbide, and silicides like molybdenum silicide. Still other such electrically conductive materials of the types disclosed above useful in the present invention will be apparent to those skilled in the art in view of the present disclosure. The electrical conductivity of the electrically conductive material is generally greater than 100 ohms resistivity, more preferably greater than 50 ohms, at 0° C. As would be apparent, this corresponds to a resistivity preferably less than 100 ohms at 0° C. The electrical resistance of the electrically conductive material layer optimally is established, e.g., by means of the chosen thickness of the layer, so that the required power to elevate the temperature of the layer (and the catalyst) above 350° C. can be generated with the available voltage source. In the case of an automotive battery (12 V) and a 300 W power requirement, the electrical resistance (R) of the electrically conductive material layer should optimally be 0.5Ω (power $W=V^2/R$). Alternatively, the resistive heating can be derived from the automotive alternator instead of from the battery and the resistance of the electrically conductive material would be tailored to the voltage source.

The electrically conductive material layer 14 is generally applied in a thickness of less than about 5000 Angstroms, more preferably being between about 1000 and 5000 Angstroms. Optimally, such materials as disclosed herein for this layer 14 have excellent durability in the harsh environment of catalyst use and, being non-metals, after heating up retain their localized heat for longer periods of time than a comparable metal conductor. Thus this electrically conductive material utilizes the heat generated more energy efficiently resulting in a lower power consumption than would have been the case if a metal conductor had been used. This efficient use of power is further enhanced by the choice of an insulating substrate 12 which prevents heat loss along the substrate.

The layer of electrically conducting material 14 may be applied onto the substrate by any suitable technique including sputtering, sol-gel process, and chemical vapor deposition. Numerous patents and printed publications are available which disclose methods of providing a layer of an electrically conductive material, such as fluorine-doped tin oxide, on a substrate. Exemplary of two such patents are U.S. Pat. Nos. 4,547,400 and 4,562,095 the teachings of which are expressly incorporated by reference herein. Still other methods of applying such electrically conductive materials on the substrate will be apparent to those skilled in the art in view of the present disclosure. In order to be able to provide an electrical current through the electrically conductive material during operation in an exhaust gas system, the electrically conductive material layer would be provided, at least prior to incorporation in the intended use environment as in an automobile, with two leads 20 and 20' which would be connected to a voltage source during operation. There is no criticality to the design, material, or particular attachment configuration of these leads 20 to the electrically conductive material layer 14.

A washcoat 16 is preferably subsequently applied onto the electrically conductive material layer 14 followed by application thereon of the catalyst 18, although the washcoat and catalyst may be applied as a single layer. As would be apparent from this disclosure, more than one washcoat and/or catalyst coating may be employed. Typically, such a washcoat may be an electrically nonconductive material such as alumina which is often stabilized when used in high temperature environments by means of additives like cerium oxide or barium oxide. In this invention, the washcoat may be any material suitable to carry a catalyst including other materials like titanium oxide, aluminum oxide, and silicon oxide, or suitable mixtures thereof. The thickness of this washcoat layer 16 is optimally generally less than about 10,000 Angstroms, preferably being between about 1000 and 10,000 Angstroms. Thickness is not however critical. The washcoat may be suitably applied, for example, by sol-gel technology, such technology being well known to those skilled the art. For example, a layer of titanium oxide may be deposited on the electrically conductive material layer by exposing it to a solution of titanium oxide prepared by acetylacetone modified titanium alkoxides.

The washcoat is impregnated with or provided with a coating of a catalyst material which is suitable to convert the components of exhaust gases, such as those from an internal combustion engine like hydrocarbons and carbon monoxide, into more desirable species like carbon dioxide and water. Such catalysts are well known to those skilled in the art. Exemplary of suitable catalysts include typical three-way catalysts, preferably being selected from the noble metals like platinum, rhodium, and palladium and mixtures thereof. Still other catalyst materials which may be employed in this invention will be apparent to those skilled in the art in view of the present disclosure. For example, oxidation catalysts like silver may also be employed. The washcoat and catalyst may also be present as a single layer over the conductive electrically conductive material layer as described above.

The catalyst may be provided on the washcoat material by any technique, for example, by means of incipient wetness techniques or decomposition from organometallic compounds, using laser assisted deposition, and from catalysts suspended in an alumina solution or from solutions of catalyst metals, to name but a few techniques.

The particular catalyst and method of providing it on the washcoat is not critical to this invention. Desirably, the electrically conductive material is of the same approximate size (area) and is located generally directly below the area encompassed by the catalyst, for optimal efficiency of heating of the catalyst during operation of the device. Optionally, a non-porous protective layer may be provided for the electrically conducting material 14 should that be desired. Such a protective layer would be located between the electrically conducting material layer 14 and washcoat, and could be composed of a metal oxide like alumina or other materials which would not interfere with the intended operation of the device as would be apparent to those skilled in the art in view of this disclosure.

This electrically heatable catalyst device can be installed in various locations in an exhaust system, such as that used to treat exhaust gases from an internal combustion engine, especially automotive engines. Desirably the invention catalyst can be installed in a bypass position so as to bring it into operation only during the first 20 or 30 seconds of engine operation. After this period of time, this catalyst device can be bypassed to optimally protect it form thermal or chemical deactivation and extend its life and durability, which is expected to be well over 100,000 miles. Moreover, it can be installed in a conventional catalyst configuration without a bypass.

Figure 2:
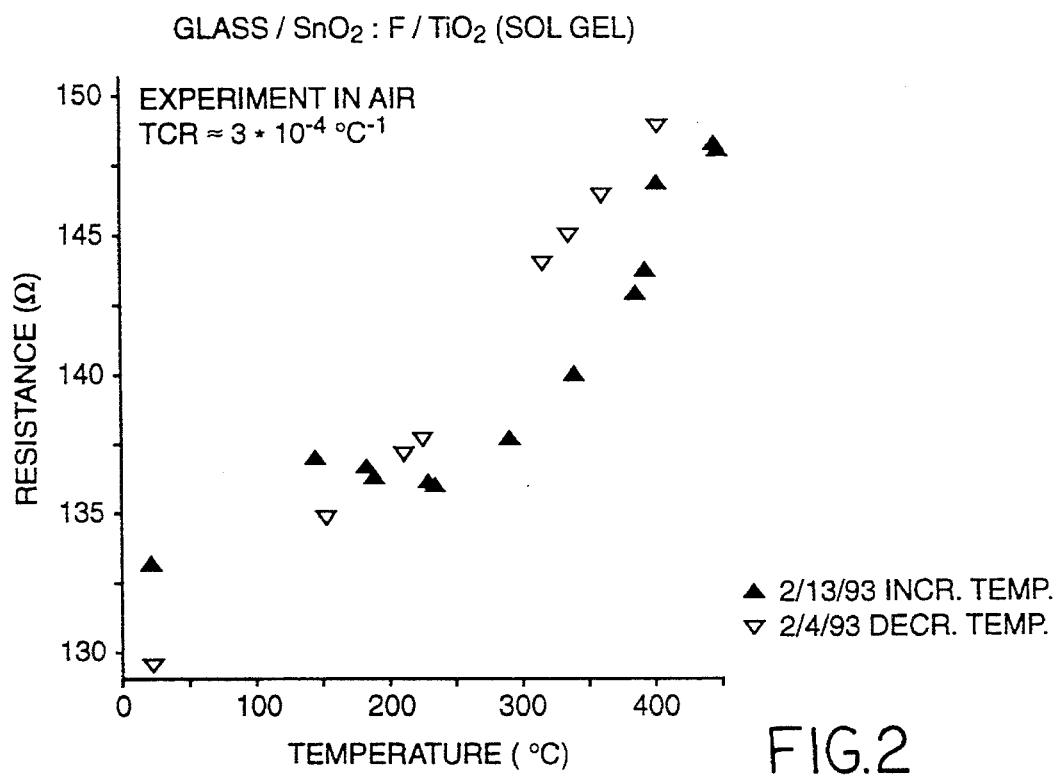
FIG. 2 shows electrical resistance as a function of temperature in an embodiment of an invention device having $SnO_2$:F as the electrically conductive layer.
Figure 3:
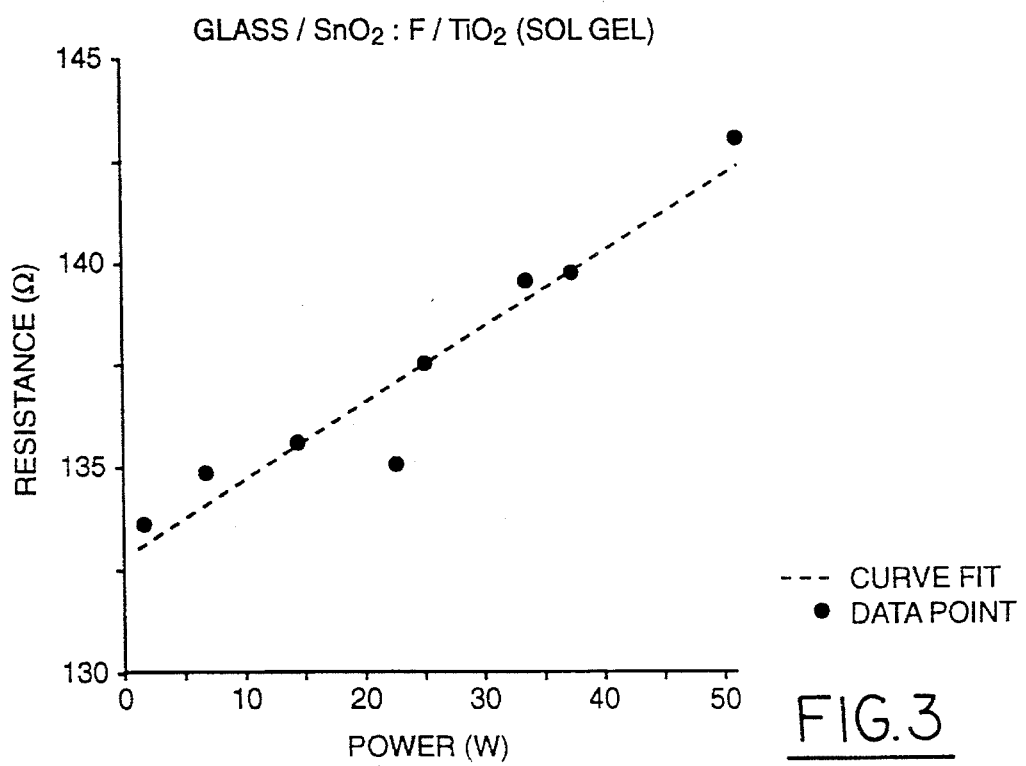
FIG. 3 shows electrical resistance as a function of applied power in the device of FIG. 2.

According to one example, a thin layer of fluorine-doped tin oxide is coated to a thickness of about 3000 Angstroms on a glass substrate. Two gold leads are attached to the tin oxide layer by applying silver paste followed by pyrolysis in air. Subsequently, a coating of titanium oxide (washcoat) is provided on the tin oxide from a solution prepared by hydrolyzing titanium 2-propoxide in 2-propanol in the presence of 2 equivalents of acetylacetone. Using this device, the data in FIG. 2 and 3 are obtained. These figures show the electrical resistance as a function of temperature (FIG. 2) and as a function of applied power (FIG. 3) and demonstrates the ability of the thin film coating to reach a temperature of 400° C. with low power consumption. In practice, a catalyst would be applied on the titanium oxide washcoat.

Figure 4:
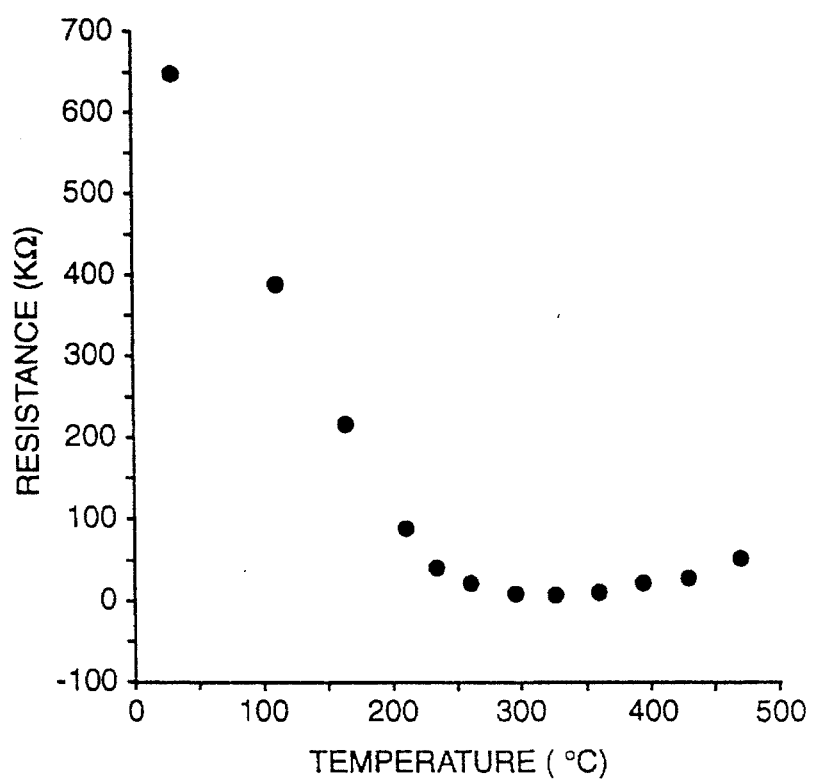
FIG. 4 shows electrical resistance as a function of temperature in an embodiment of an invention device having $In_2O_3$:$SnO_2$ as the electrically conductive layer.

Another model catalyst system is prepared on an alumina substrate from a solution obtained by dissolving indium tris (acetylacetonate) in tetrahydraforan, adding tin tetra-(2-propoxide), ethanolamine, and water. FIG. 4 shows the change in the resistance of such a system as a function of temperature. It can be seen that the room temperature resistance is high with the thickness of the conductive layer as applied, so that for optimal practical ability to increase its temperature by resistive heating, the conductive layer would desirably be applied as a thinner layer. This device would be provided with a catalyst for operation according to this invention, e.g., platinum, palladium or rhodium or mixtures thereof.

We claim:

1. An electrically heatable catalyst device comprising;

an electrically insulating substrate;

a layer of an electrically conductive material selected from the group consisting of flourine-doped tin oxide and tin oxide-doped indium oxide applied over a surface of the substrate;

a washcoat carried on a surface of the electrically conductive material layer; and a catalyst carried on a surface of the washcoat.

2. The catalyst device according to claim 1, wherein said electrically conductive material layer is less than about 5000 Angstroms in thickness.

3. The catalyst device according to claim 1, wherein said washcoat is selected from the group consisting of (a) alumina, (b) titanium oxide, (c) silicon oxide, (d) mixtures thereof, and (e) any of said a, b, c, and d, combined with stabilizers.

4. The catalyst device according to claims 3, wherein said washcoat further comprises stabilizers selected from barium oxide and cerium oxide.

5. The catalyst device according to claim 1, wherein said catalyst is selected from the group consisting of noble metals and mixtures thereof.

6. The catalyst device according to claim 1, wherein said substrate is provided in a configuration selected from the group consisting of a monolithic honeycomb, spun fibre, corrugated foil and layered material.

7. The catalyst device according to claim 1, wherein said electrically conductive material layer is of approximately the same area as said washcoat.

8. The catalyst device according to claim 1, wherein the washcoat and catalyst are present as a single layer over the electrically conductive material layer.

9. The catalyst device according to claim 1, wherein said electrically conductive material layer has an electrically resistivity less than 100 ohms at 0° C.

* * * * *